UNITED STATES PATENT OFFICE.

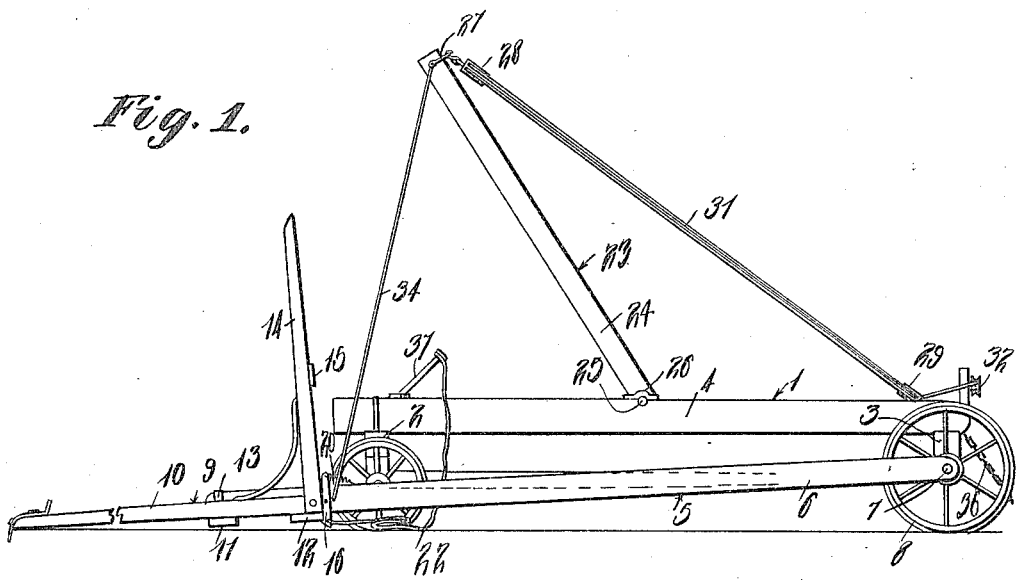
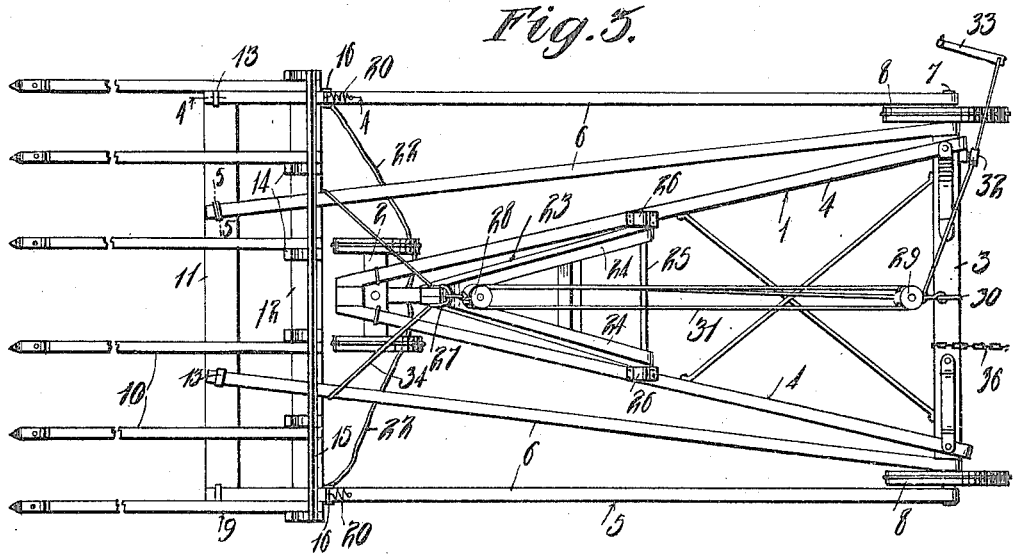

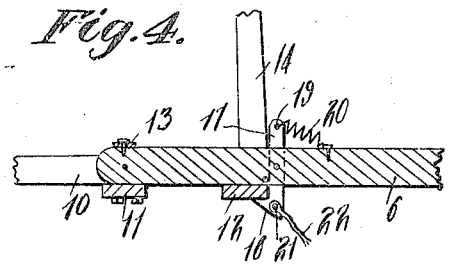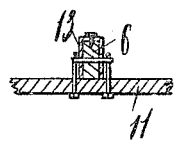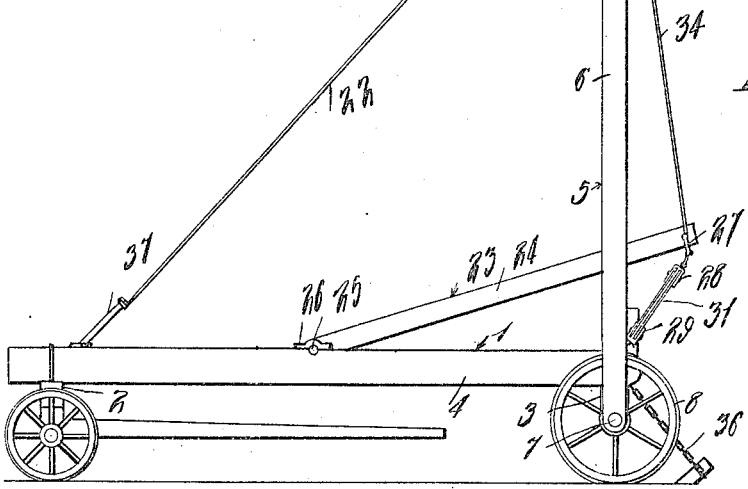

PETER B. JOHNSON, OF BRADISH, NEBRASKA.

HAY-STACKER.

1,187,742.

Specification of Letters Patent.

Patented June 20, 1916.

Application filed January 29, 1914. Serial No. 815,236.

*To all whom it may concern:*

Be it known that I, PETER B. JOHNSON, a citizen of the United States, residing at Bradish, in the county of Boone, State of Nebraska, have invented certain new and useful Improvements in Hay-Stackers; and I do hereby declare the following to be a full, clear, and exact description of the invention, such as will enable others skilled in the art to which it appertains to make and use the same.

The present invention is directed to improvements in hay stackers, and has for its object to so construct a device of this character that hay may be quickly stacked.

A further object of the invention is to so construct a device of this character that the same may be moved from place to place, and after properly positioned for stacking the hay the fork is elevated so as to discharge the hay therefrom to form a stack.

With these and other objects in view, this invention resides in the novel features of construction, formation, combination and arrangement of parts to be hereinafter more fully described, claimed and illustrated in the accompanying drawing, in which:—

Figure 1 is a side elevation of the device, showing the fork in position to receive the load. Fig. 2 is a similar view showing the fork elevated and in a position to discharge the load. Fig. 3 is a top plan view of the device in its loading position. Fig. 4 is a sectional view on line 4—4 of Fig. 3. Fig. 5 is a similar view on line 5—5 of Fig. 3. Fig. 6 is a fragmentary detail perspective view of one of the bars of the fork frame.

Referring to the drawing, the numeral 1 designates a wheeled frame, which consists of front and rear bolsters 2 and 3, respectively, the bars 4 of said frame being arranged in converging relation and having their forward ends connected and secured in any suitable manner to the bolster 2, said bars having their rear ends spaced and secured to the rear bolster 3, whereby said bars are arranged in converging relation.

The fork frame 5 consists of convergingly arranged bars 6, the rear ends of which being pivotally connected to the rear axle 7, and upon opposite sides of the rear wheels 8. The tiltable fork 9 comprises a plurality of normally horizontally disposed teeth 10 which are connected near their rear ends by spaced parallel bars 11 and 12, the bar 11 being provided with pivotally connected clips 13 in which are secured the forward ends of the bars 6 of the fork frame. Rising vertically from the bar 12 are teeth 14, said teeth being suitably connected to the sides of the teeth 10, said teeth 14 being properly braced by the bar 15.

To a pair of bars 6 are pivotally connected latches 16, which consist of arms 17, the lower ends of which are provided with hooks 18, said hooks being designed to engage the forward edge of the brace bar 12, thus holding the fork against accidental tilting. The upper ends of the arms 17 are connected by a pin 19 to which is connected one end of the coil spring 20, the other end of which is connected to the bar 6, said spring serving to normally hold the hooks 18 in engagement with the under surface of the bar 12. A pin 21 connects the lower ends of the arms 17 and has attached thereto cord 22, which when drawn taut will rock the latch 16 so that the fork 9 may tilt so as to discharge the hay therefrom during the stacking operation.

A sweep frame 23 is provided, and consists of convergingly arranged bars 24, the lower ends of which are pivotally connected to the transverse shaft 25 which has its opposite ends supported in boxings 26 carried by the side bars 4 of the frame 1. The upper ends of the bars of the sweep are connected and have attached thereto a clip 27 and to which is fastened a pulley block 28, a similar pulley block 29 being connected to the clip 30 carried by the rear bolster 3. Trained through the pulley blocks 28 and 29 is a rope 31, said rope being also engaged with the guide pulley 32 mounted upon the bolster 3. The free end of the rope 31 is provided with a whiffle tree 33 and to which the draft animals are attached so that when they move away from the device the sweep frame 23 will be rocked, and through the medium of the wire cables 34, which have one of their ends connected to the sweep and their other ends to the bar 35 connecting the forward ends of the bars 6, said bars will be swung upwardly together with the fork 9 until the parts are in the position, as shown in Fig. 2, whereupon pulling upon the cord 22 the fork 9 will be permitted to tilt owing to the disengagement of the latch 16 from the bar 12. It will be of course understood that the fork is returned to its normal or loading position upon backing the draft animals.

To the rear bolster 3 is connected a chain 36 which may be anchored to the ground in any suitable manner so as to hold the frame 1 stationary during the time the draft animals are moving away from the frame and pulling upon the rope 31. A pin 37 is mounted upon the forward end of the frame 1 and has connected thereto the ends of the cords 22, said cords serving, when the frame 5 is in a substantially vertical position to automatically trip the latches 16, thus permitting the fork to tilt.

What is claimed is:—

In a hay stacking device, a wheel supported frame, a fork frame pivotally mounted thereon and adapted to extend forwardly therefrom, a fork pivotally mounted on the fork frame, means to raise the fork frame to a vertical position at the rear of the wheel supported frame, a latch carried by the fork frame and engageable with the fork to normally prevent pivotal motion of the fork on its frame, and a cord connected at one end to the wheel supported frame and its opposite end to the latch, said cord being arranged to release the latch from the fork whereby to permit pivotal movement of the fork and to limit the movement of the free end of the fork frame in a rearward direction when the latch is released.

In testimony whereof, I affix my signature, in the presence of two witnesses.

PETER B. JOHNSON.

Witnesses:
 CHAS. OLSON,
 HANS DAHLSTEN.

Copies of this patent may be obtained for five cents each, by addressing the "Commissioner of Patents, Washington, D. C."